Sept. 24, 1929.  H. L. WHITTEMORE  1,729,466
DIAL MICROMETER
Filed Nov. 29, 1926
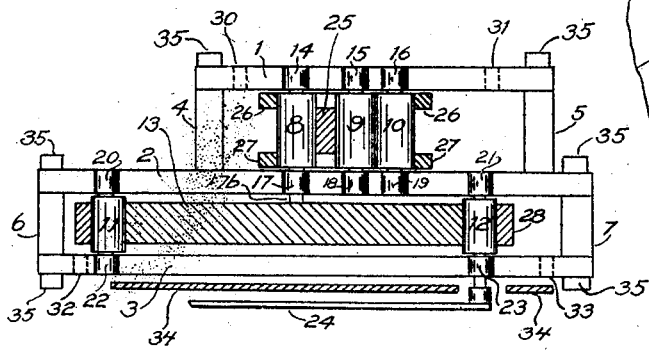
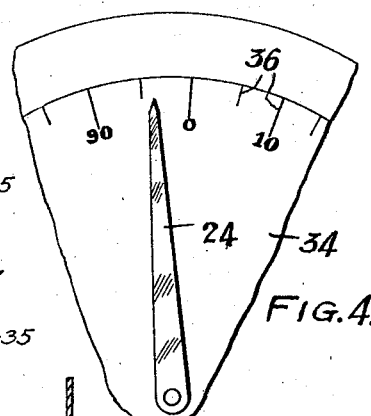
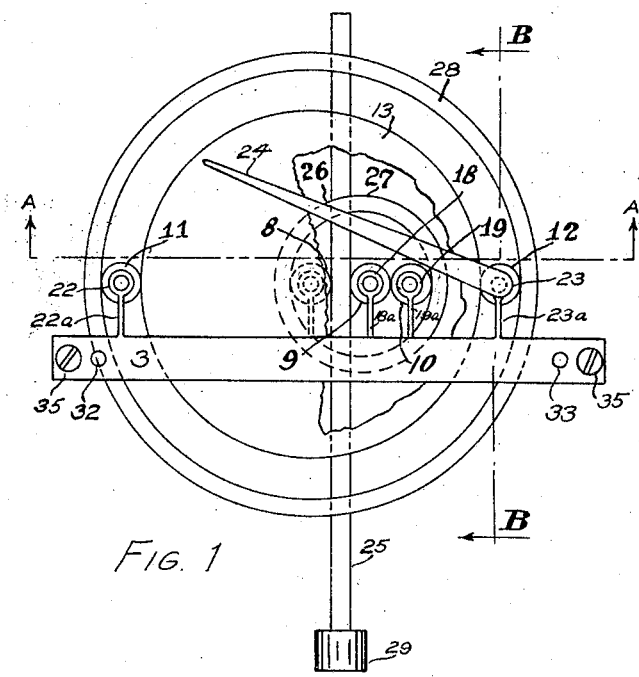
*Herbert L. Whittemore*
INVENTOR Patented Sept. 24, 1929

1,729,466

UNITED STATES PATENT OFFICE

HERBERT L. WHITTEMORE, OF WASHINGTON, DISTRICT OF COLUMBIA

DIAL MICROMETER

Application filed November 29, 1926. Serial No. 151,529.

My invention relates to improvements in dial micrometers in which the translatory movement of a spindle is converted into rotary movement of a pointer, and the movement of the spindle greatly multiplied so that the pointer moves through a relatively large arc for a small movement of the spindle.

This type of instrument, as generally constructed at present, contains as essential elements several gear wheels and a rack. Due to irregularity in the tooth contours of the gear wheels and the rack, eccentric mounting of the gear wheels upon their shafts, and the slight amount of backlash which cannot be avoided, the present type of instrument fails to give the highest degree of accuracy.

The gear wheels, being quite thin, are liable to be deformed under heavy load. The whole train of gearing is rigidly connected, and no provision is made for allowing slippage between the various members of the train in case of too severe or sudden stress. Due to this rigidity of the gear train, and the fact that the train has some inertia, individual teeth are subjected to excessive stresses when loads are suddenly applied or released, as in the case of the breaking of a specimen under test. As a consequence of the excessive stresses on individual teeth, the present type of instrument is subject to undue wear.

The object of my invention is to avoid the inaccuracies due to the rack and gearing construction, at the same time providing an instrument that is rugged and durable and the parts of which can be easily made.

In the drawings, Fig. 1 is a front elevation of the instrument, with the dial 34 removed, and with a portion of the roll 13 broken away to show the mechanism in rear thereof. Fig. 2 is a side elevation of the instrument, showing the dial 34 in section along the line B—B in Fig. 1, to show more clearly the method of attaching the pointer 24 to the shaft of the roller, 12. Fig. 3 is a sectional view along the line A—A of Fig. 1. The dial 34 is a thin circular disc having its center coincident with the axis of roll 12. A portion of the right hand edge of the dial 34 is broken away in Fig. 3. Fig. 4 is an elevation of a portion of the front of the dial, 34. Although the dial, 34, is a circular disc having its center coincident with the axis of the roll, 12, only a portion of the dial, 34, is shown in Fig. 4, with the pointer, 24, and a few of the graduations, 36, on the face of the dial, 34.

The frame of the instrument consists of the three parallel bars 1, 2 and 3, spaced from each other by the four spacing bars 4, 5, 6 and 7, the whole being rigidly held together by screws 35. The bearings 14, 15 and 16 are above and integral with the bar 1. The bearings 17, 18, 19, 20 and 21 are above and integral with the bar 2. The bearings 22 and 23 are above and integral with the bar 3. Each of these bearings is joined to its respective bar by a thin vertical flexible web. In Fig. 1 will be seen the bearings 22 and 23 joined to the bar 3 by the webs 22$^a$ and 23$^a$ respectively, and also the bearings 18 and 19 joined to the bar 2 by the webs 18$^a$ and 19$^a$ respectively. In Fig. 2 will be seen the bearing 23 joined to the bar 3 by the web 23$^a$, the bearing 21 joined to the bar 2 by the web 21$^a$, and the bearing 16 jointed to the bar 1 by the web 16$^a$. As each of these thin vertical webs is flexible, each of the bearings is free to move to a certain extent longitudinally of the bars 1, 2 and 3. However, as the planes occupied by the webs are perpendicular to the bars, it is apparent that the bearings are restrained from moving transversely of the bars.

The roll 8 and the larger roll 13, which are integrally connected by the shaft 17$^b$, are supported by the bearings 14 and 17. The roll 9 is supported by the bearings 15 and 18. The roll 10 is supported by the bearings 16 and 19. The roll 11 is supported by the bearings 20 and 22. The roll 12, to which is attached a suitable pointer 24, is supported by the bearings 21 and 23. Each of the rolls is rotatable with respect to its supporting bearings. In addition, each of the rolls, together with its respective bearings, is movable longitudinally with respect to the frame of the instrument, due to the manner in which each bearing is attached to the frame by flexible web.

The vertical spindle 25, bearing at its lower end the contact member 29, passes between the rolls 8 and 9. Elastic steel rings 26 and 27 encircle the rolls 8, 9 and 10, and thus hold the spindle 25 in contact with rolls 8 and 9. A similar, but larger, ring 28 encircles the rolls 11, 13 and 12, and holds the roll 13 in contact with the roll 12. Each of the elastic rings 26, 27 and 28 has such an internal diameter that the ring is normally slightly too small to encircle its inner rolls, it being necessary to slightly flatten each ring as it is slipped over its set of rolls. Thus each of the elastic rings is distorted by the set of rolls which it encircles, lengthened slightly in a direction longitudinal of the frame of the instrument, and thereby caused to exert a compressive force on the set of rolls which it encircles.

In the frame bars 1 and 3, are holes 30 and 31, and 32 and 33, respectively. By means of bolts which may be passed through these holes, the frame of the instrument may be secured to a rigid support, or to a suitable protecting case.

In operation, if the instrument is to be used to compare the thicknesses of various specimens, the instrument is secured to a rigid support, and the various specimens are in turn placed under the contact member 29, which is held down by gravity. The spindle 25 when raised or lowered rotates the roll 8 and the integral roll 13. This latter roll rotates the roll 12 and hence the pointer 24. Thus, changes in the elevation of the contact member 29 are indicated by the pointer 24 on a suitable dial 34, graduated in suitable divisions 36. As the dial 34 is a circular disc having its center in the axis of the roll 12, the pointer 24 may rotate around the dial 34 in either direction depending upon the direction in which the contact member 29 is moved. If the contact member 29 moves a sufficient distance the pointer 24 may move around the dial 34 several times.

Assuming the spindle 25 to move upwardly, roll 8, and incidentally the rings 26 and 27, will move in a counterclockwise direction. Since the radius of roll 13 is much greater than that of roll 8, a small movement of the spindle 25 and roll 8 will cause a relatively large movement of a point on the circumference of roll 13. Roll 12, in contact with the roll 13, will move in a clockwise direction, as will the pointer 24. Since the radius of the pointer 24 is much greater than that of the roll 12, a relatively small movement of the roll 13 and of the roll 12 will cause a relatively large movement of the pointer 24. Thus it will be seen that movement of the spindle 25 is multiplied so as to result in a large movement of the outer tip of the pointer 24.

Since the various rolls employed in this instrument may be machined accurately to the proper diameters, and since there is very little wear of the rolls, the instrument is very accurate. In addition, any error in the instrument is one which gradually increases or decreases throughout the range of motion. Therefore, between any two nearby points on the scale, the error is rendered very small. In the old type of instrument, because of the irregularities of the gear teeth and other causes, the error in calibration is usually erratic. Thus between two nearby points on the scale, the error might happen to constitute a large proportion of the distance measured, with a consequent inaccuracy of reading.

It is apparent that if a large load is suddenly applied to the instrument, it is possible for the spindle 25 to slip relative to the rolls 8 and 9, or for any of the rolls and rings to slip relative to their adjacent rolls, and thus avoid injury to the mechanism. However, the elastic rings 26, 27 and 28 are under sufficient tension to hold the rolls in firm contact with each other and with the spindle 25, so that in ordinary operation there is no slipping.

I claim:

1. In a dial micrometer, the combination of a frame, pairs of aligned bearings, thin flexible webs connecting each bearing with the frame, rolls mounted in parallel relation in the bearings, a spindle between two of the rolls and extending transversely to the plane of the axes of said rolls, and elastic rings holding the two said rolls in rolling contact with the spindle, each of the rolls, the spindle and the rings being capable of slipping relatively to their adjacent rolling members when excessive load is applied to the spindle and indicating means attached to one of the rolls of the combination and movable therewith.

2. In a dial micrometer, the combination of a frame, pairs of aligned bearings movable to a limited extent with respect to the frame, a spindle extending transversely to the plane of the axes of said bearings, means comprising a plurality of rolls mounted in parallel relation in the said bearings and elastic rings exerting pressure on said rolls for changing the reciprocatory motion of the spindle into rotary motion, means comprising another series of parallel rolls, means for connecting one of the first named rolls to one of the last named rolls and an elastic ring exerting pressure on the last named rolls, and a pointer fixed to one of the last named rolls.

3. In a dial micrometer, the combination of a spindle, a plurality of parallel rolls extending transversely to the spindle, and an elastic ring, each of said members being in rolling contact with two others of said members and indicating means attached to one of the rolls and movable therewith.

4. In a dial micrometer, the combination of a spindle, a plurality of parallel rolls extending transversely to the spindle, and a plurality of elastic rings, each of said members being in rolling contact with two others of the said members and indicating means attached to one of the rolls and movable therewith.

5. In a measuring instrument, a train of rolling members for converting translatory motion into rotary motion comprising a plurality of parallel rolls and an elastic ring encircling the said rolls, a reciprocating spindle between two of the said rolls extending transversely to the plane of the axes of said rolls, the elastic ring holding two of the said rolls in rolling contact with the spindle and indicating means attached to one of the rolling members of the train, and movable therewith.

6. In a measuring instrument, a train of rolling members for converting translatory motion into rotary motion comprising a plurality of parallel rolls and a plurality of elastic rings encircling the said rolls, a reciprocating spindle between two of the said rolls extending transversely to the plane of the axes of said rolls, the elastic rings holding two of the said rolls in rolling contact with the spindle and indicating means attached to one of the rolling members of the train, and movable therewith.

HERBERT L. WHITTEMORE.